(12) United States Patent
You et al.

(10) Patent No.: US 11,026,410 B2
(45) Date of Patent: Jun. 8, 2021

(54) ENERGY-DRIVEN IN-SITU PLANKTON COLLECTING DEVICE

(71) Applicant: DALIAN UNIVERSITY OF TECHNOLOGY, Dalian (CN)

(72) Inventors: Kui You, Dalian (CN); Meiyi Wu, Dalian (CN); Zihan Zhou, Dalian (CN); Zewen Chen, Dalian (CN); Caihua Ma, Dalian (CN); Fang Zhang, Dalian (CN); Jing Dong, Dalian (CN); Ling Zhu, Dalian (CN); Chen Hou, Dalian (CN); Honggang Ma, Dalian (CN); Xintian Liu, Dalian (CN); Hua Xu, Dalian (CN); Fangxin Han, Dalian (CN); Shaojun Wang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 225 days.

(21) Appl. No.: 16/476,513

(22) PCT Filed: May 23, 2018

(86) PCT No.: PCT/CN2018/087944
§ 371 (c)(1),
(2) Date: Jul. 8, 2019

(87) PCT Pub. No.: WO2018/223840
PCT Pub. Date: Dec. 13, 2018

(65) Prior Publication Data
US 2020/0281177 A1    Sep. 10, 2020

(30) Foreign Application Priority Data

Jun. 6, 2017    (CN) .......................... 201710415974.X

(51) Int. Cl.
*A01K 69/04*    (2006.01)
*H02S 10/12*    (2014.01)
(Continued)

(52) U.S. Cl.
CPC .............. *A01K 69/04* (2013.01); *H02S 10/12* (2014.12); *H02S 10/20* (2014.12); *H02S 10/40* (2014.12)

(58) Field of Classification Search
CPC ........ A01K 69/04; A01K 61/20; H02S 10/12; H02S 10/20; H02S 10/40; H02S 20/20;
(Continued)

(56) References Cited

FOREIGN PATENT DOCUMENTS

| CN | 101367427 A | 2/2009 |
|----|-------------|--------|
| CN | 103931572 A | 7/2014 |

(Continued)

*Primary Examiner* — Daniel Cavallari
(74) *Attorney, Agent, or Firm* — Muncy, Geissler, Olds & Lowe, P.C.

(57) ABSTRACT

The present invention provides a new energy-driven in-situ plankton collecting device, comprising a solar photovoltaic cell and wind power generation system, a buoyancy support system, a power supply and control system, a plankton suction and collection system, and an anchoring system. The device has the center of gravity on the lower part and vertically floats in water like a tumbler. The plankton suction and collection system is composed of a suction axial-flow pump and a collecting cod end. The bag-shaped plankton collecting cod end has the mesh aperture of less than 0.8 time the average body length of the target plankton, and can be used on both sides. The devices provided by the present invention can be used simultaneously and arranged in an array for collection and utilization of plankton as well as governance and remediation of water area environment, and thus have a favorable application prospect.

3 Claims, 2 Drawing Sheets

(Fig.1 as an illustration in Abstract)

(51) Int. Cl.
*H02S 10/20* (2014.01)
*H02S 10/40* (2014.01)

(58) Field of Classification Search
CPC .......... Y02E 70/30; Y02E 10/50; Y02P 60/60;
C02F 2303/20; C02F 1/40; A01D 44/00
See application file for complete search history.

(56) References Cited

FOREIGN PATENT DOCUMENTS

| | | | |
|---|---|---|---|
| CN | 205962421 U | | 2/2017 |
| CN | 106554089 A | * | 4/2017 |
| CN | 106554089 A | | 4/2017 |
| CN | 206101306 U | | 4/2017 |
| CN | 107182434 A | | 9/2017 |
| JP | 2005-052136 A | | 3/2005 |
| KR | 20150067659 A | * | 6/2015 |

* cited by examiner

Fig. 1 (Fig.1 as an illustration in Abstract)

ENERGY-DRIVEN IN-SITU PLANKTON COLLECTING DEVICE

TECHNICAL FIELD

The present invention belongs to the field of engineering equipment and technique for cultivating and harvesting aquatic microorganisms and relates to a new energy-driven in-situ plankton collecting device.

BACKGROUND

Aquatic microorganisms have many species, and generally include phytoplankton and zooplankton, which provide primary productivity and secondary productivity important for the aquatic ecosystem. Figuratively speaking, aquatic phytoplankton and zooplankton are respectively equivalent to grassland and cattle and sheep in the terrestrial ecosystem, providing food for various subsequent carnivores. For example, various aquatic animals, such as fish, shrimp, crab and shellfish, which have economic value, reply on plankton for survival. Then, it is easy to understand that if aquatic plankton are harvested and utilized directly instead of indirectly by catching fish, shrimp, crab and shellfish, the resource utilization efficiency will be increased a lot obviously. According to the Lindemans efficiency of one-tenth law in ecology, if phytoplankton and zooplankton are directly harvested and utilized, the utilization efficiency of aquatic ecosystem productivity will be increased by at least 10 to 100 times.

In fact, people have already begun to develop and utilize various plankton, and the most common is the cultivation and utilization of aquatic single-celled algae. Single-celled algae is also called unicellular algae, i.e. aquatic plant with only one cell, generally called microalgae which have wide varieties and diversified functions. Some microalgae can specifically synthesize and accumulate certain substances with important medicinal value, health value and economic value, such as microalgae producing carotenoid and astaxanthin, oil-rich microalgae, protein-rich microalgae, spirulina, etc., thus having a high economic value and forming a large industry. The patent technologies for cultivating and harvesting microalgae are numerous, up to several thousand.

Common microalgae collection methods or phytoplankton collection methods include filtration, centrifugation, flocculation, etc., wherein the filtration method is easy to cause blockage, and the centrifugal method consumes a large amount of energy, which are rarely used alone. The existing microalgae collection methods and advanced technologies are often the combined application of various flocculation technologies and filtration or centrifugation methods. Microalgae are flocculated by many methods, including addition of flocculant, sedimentation, air flotation, electrophoresis or electric field action, change of pH value, etc. The basic idea of microalgae flocculation is to force the microalgae to aggregate into a mass by certain methods so as to flocculate, and then to collect and utilize the microalgae. The various flocculation methods of forcing the microalgae to aggregate into a mass generally cause a certain degree of damage to the microalgae so that the microalgae no longer aggregate into a mass in a natural floating survival mode. Generally, it is necessary to add a certain substance or consume a certain amount of energy, which will more or less have a certain impact on the quality of microalgae and need certain economic cost. Therefore, up to now, there is no perfect method exists. In the indoor intensive high-density microalgae cultivation and production method, the microalgae collection process is generally separated from the cultivation and production process. The microalgae culture solution is generally delivered to the collecting device to separately harvest microalgae outside the microalgae cultivation and production process, irrespective of continuous production. The microalgae collection patents of the various above-mentioned technologies and the combined application thereof have wide varieties and respectively have different advantages and disadvantages.

In fact, in the natural aquatic ecosystem, various animals, such as fish, shrimp, crab and shellfish, which ingest plankton, can be regarded as natural aquatic microorganism collecting devices which do not require additional measures or energy consumption. The ingestion process of fish, shrimp, crab and shellfish with the plankton feeding habit can be regarded as high-efficiency aquatic microorganism collection. The present invention designs an innovative plankton collecting technology and device adopting the original filter method, drawing on the ingestion behavior of large animals in the natural aquatic ecosystem.

SUMMARY

The present invention aims to solve the above mentioned problems existing in the prior art of aquatic plankton collection, and provides a new energy-driven in-situ plankton collecting device which is suitable for collection and utilization of different kinds of plankton.

The technical solution of the present invention is as follows:

A new energy-driven in-situ plankton collecting device, comprising a solar photovoltaic cell and wind power generation system, a buoyancy support system, a power supply and control system, a plankton suction and collection system, and an anchoring system, wherein the solar photovoltaic cell and wind power generation system is arranged above the buoyancy support system and provides steady power supply by respectively using solar energy in fine weather and wind energy in nature and transforming and storing the power provided by the two kinds of new energy in the battery of the power supply and control system; the buoyancy support system is composed of floating balls and connecting pieces and provides buoyancy support for the whole device, the buoyancy support system is connected with the anchoring system to keep the device vertically floating in the designated area of the water with the center of gravity below the water surface and to ensure that the height of the solar photovoltaic cell and wind power generation system above the water surface is more than 1.2 times the maximum wave height of the water area, so that the buoyancy support system can be protected from erosion or damage by stormy waves of the water area and can resist impact of unprecedented stormy waves; and the power supply and control system is connected with the plankton suction and collection system, the plankton suction and collection system is fixed on the buoyancy support system, arranged below the water surface and above the anchoring system and composed of a plankton suction axial-flow pump and a collecting cod end which are connected by elastic buckles, and the plankton suction and collection system can be conveniently connected and removed and is used for sucking and collecting the target plankton.

The plankton suction axial-flow pump is driven by a variable frequency motor with adjustable power and is provided with steady power supply by the battery; and the caliber of the inlet end of the plankton suction axial-flow pump gradually becomes smaller along the water flow suction direction and always faces the direction of the natural water flow to reduce energy consumption and improve the plankton collection effect.

A flow rate sensor and an alarm device are arranged in the plankton suction axial-flow pump; the initial suction water flow rate of the axial-flow pump is set to be more than 1.2 times the maximum average escape movement speed of plankton to be collected; and when the filtering cod end is blocked to a certain degree due to the fact that the collecting cod end filters and collects a certain amount of target plankton so that the suction water flow rate of the axial-flow pump drops below the maximum average escape movement speed of plankton to be collected, the alarm device gives an alarm reminder to replace the collecting cod end.

Further, the mesh size of the collecting cod end is less than 0.8 time the average size of the target plankton to be collected.

Further, the collecting cod end has a bag shape with a small mouth and a large belly, the mouth is a rigid ring that cannot be deformed, and the structures of both sides of the collecting cod end are the same for double-sided use.

Further, an annular groove is arranged on the periphery of the outlet end of the plankton suction axial-flow pump, radial elastic buckles with outward elasticity direction are uniformly arranged on the outer side of the groove, and gripping or loosening the circle of elastic buckles can reduce or restore the diameter of the annular groove on the outlet end of the axial-flow pump for installing or removing the collecting cod end.

Further, the annular groove on the outlet end of the axial-flow pump can be closely sheathed and connected with the rigid ring mouth of the plankton collecting cod end. The elastic buckles behind the annular groove on the outlet end of the plankton suction axial-flow pump have an outward restoration direction and present a radial bell mouth shape under the natural state. After the circle of elastic buckles is gripped, the diameter of the annular groove can be forced to be slightly less than that of the mouth of the plankton collecting cod end so as to smoothly sheathe the rigid ring mouth of the collecting cod end in the annular groove. After the circle of elastic buckles is loosened, the elasticity is restored, i.e., the plankton collecting cod end is naturally strutted, and the diameter of the annular groove is slightly increased so that the rigid ring mouth is stuck in the annular groove to complete connection. The combination process is shown in FIG. 3 of the description. Similarly, gripping the circle of elastic buckles on the outlet end of the axial-flow pump can smoothly take down the plankton collecting cod end. In other words, the plankton suction axial-flow pump and the collecting cod end of the device of the present invention can be closely combined and smoothly removed conveniently.

The anchoring system of the device comprises a balance weight, an anchor chain and a bottom anchor, wherein the balance weight is used to adjust the position of the center of gravity and the floating performance of the whole device to enable the whole device to have a tumbler nature and to keep the solar photovoltaic cell and wind power generation system always surfacing in a vertical state, and the balance weight is tied to the bottom anchor by an anchor chain to be able to resist the impact of stormy waves and water flow of the water area used and the impact of unprecedented stormy waves.

The present invention has the beneficial effect that the new energy-driven in-situ plankton collecting device composed of the above five systems is driven by new green energy without consuming additional energy and is suitable for collection and utilization of plankton cultivated in various natural water areas and large water areas and not for collection and utilization of indoor intensive microalgae or microbes. When the device is used for collecting plankton, a collecting cod end with appropriate mesh is selected according to the size of the target plankton and replaced regularly or according to the reminder of the flow rate alarm in the plankton suction axial-flow pump. After the collecting cod end filled with plankton is taken down and turned over, then the collected plankton can be obtained and further treated and used.

The device of the present invention can be arranged in an array in large water areas, as shown in FIG. 2 of the description, for collecting large-area microalgae or other plankton for production and utilization. Each device arranged in the array is equivalent to a constant fish in a natural water area. The target plankton can be obtained by the replacement of the collecting cod end, replacing the cod end once is equivalent to harvesting a fish, and no additional energy consumption is required, so the use is simple and convenient. The technique of the present invention can also be used for governance and remediation of water area environment, and is especially suitable for governance and prevention of algal blooms in eutrophic water. After a water area environment is eutrophicated, harmful algal blooms easily occur and are difficult to govern and eliminate. The devices of the present invention are arranged in an array in such a water area, and the plankton collecting cod end is regularly replaced so as to remove microalgae of where algal blooms break out. Thus, the device can be used for emergency governance of disasters in eutrophic water bodies. Using the device of the present invention for removing plankton in eutrophic water areas without algal blooms can play a role of preventing breaking out of harmful algal blooms.

DESCRIPTION OF DRAWINGS

The figures of the description show the new energy-driven in-situ plankton collecting device of the present invention.

Figure 1:
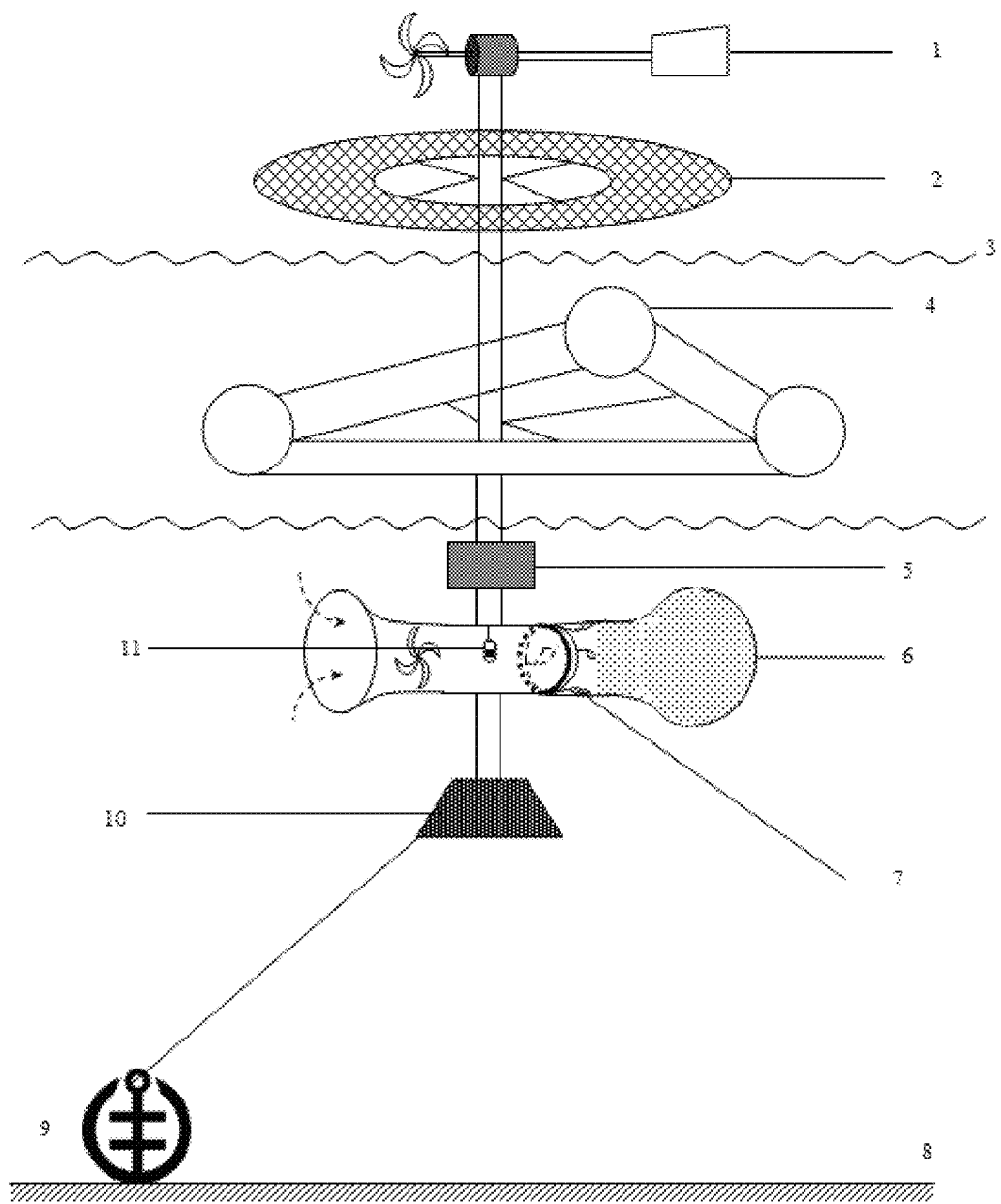
FIG. 1 is a schematic diagram of the whole device.
Figure 2:
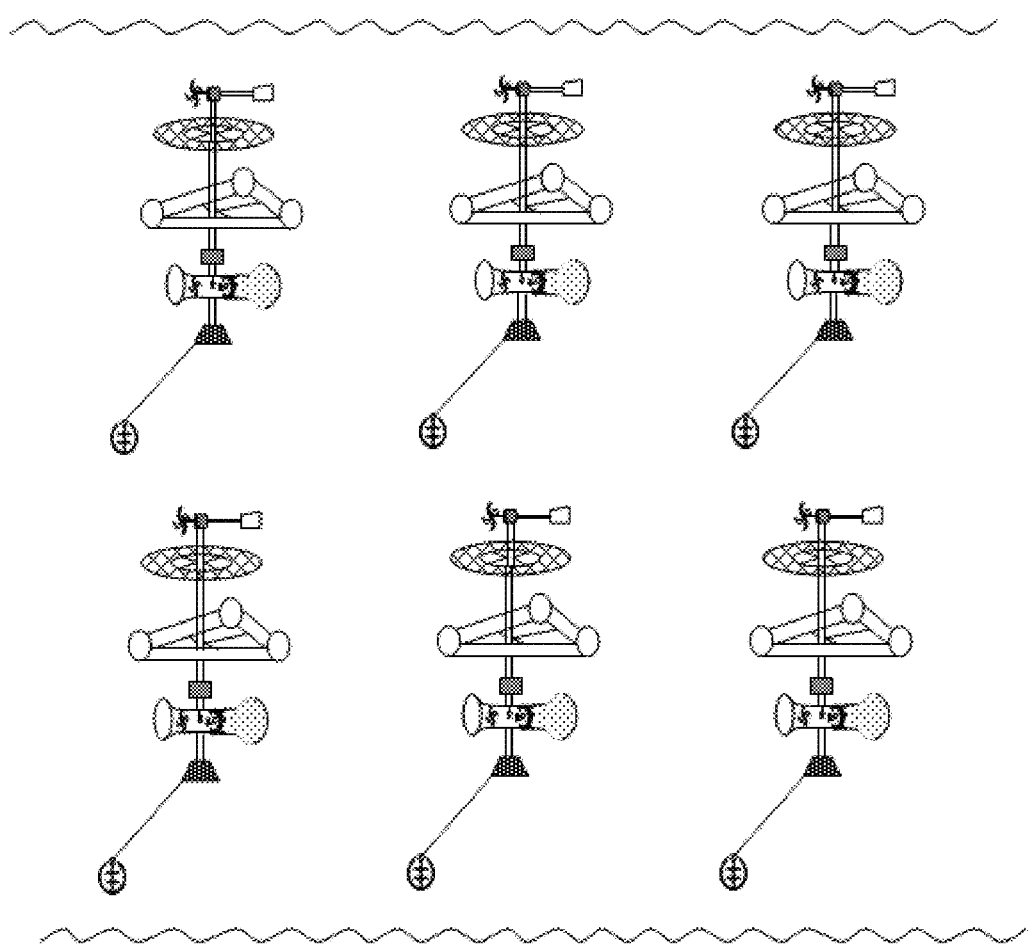
FIG. 2 is a schematic diagram of installation and application of a device of the present invention in large water areas.
Figure 3:
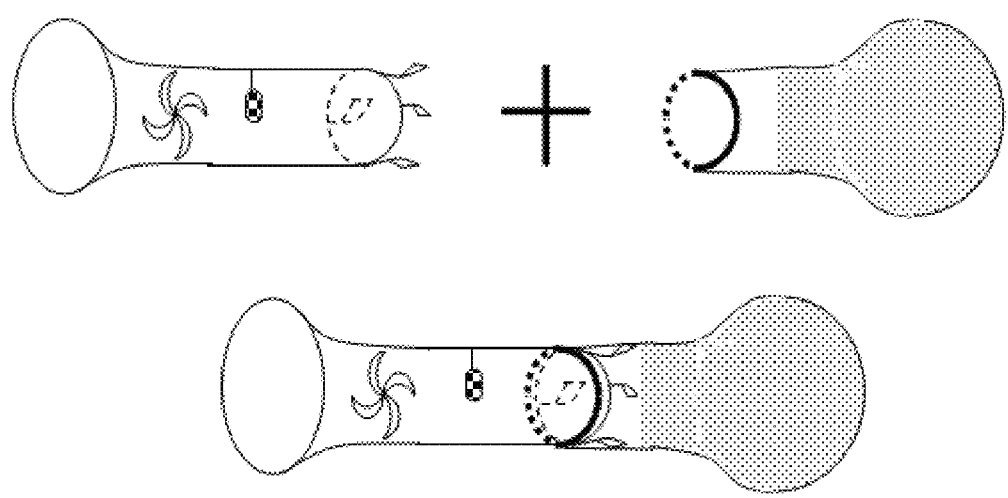
FIG. 3 is a schematic diagram of disassembly and installation of the suction and filtration system of a device of the present invention.

In the figures: 1 wind power generation system; 2 solar photovoltaic cell generation system; 3 water surface wave line; 4 floating ball support system; 5 power storage and control system; 6 plankton collecting cod end; 7 elastic buckle for installation of plankton filter screen; 8 bottom of water body; 9 bottom anchor; 10 balance weight; 11 flow rate sensor in suction system.

DETAILED DESCRIPTION

Specific embodiments of the present invention are described below in detail in combination with the technical solution and accompanying drawings.

The new energy-driven in-situ plankton collecting device of the present invention is composed of 5 parts, namely, a solar photovoltaic cell and wind power generation system above the water surface, a buoyancy support system, a power supply and control system below the water surface, a plankton suction and filtration system, and an anchoring system. The wind power generation system 1 and the solar photovoltaic cell generation system 2 generate power by using solar energy and wind power in nature to provide power supply for the power storage and control system 5 of the device. The orientation of the wind power generation system 1 varies with the wind direction, and the fan impellers are always kept in the windward direction. The core component of the device is the plankton suction and collection system which is composed of a plankton suction axial-flow pump and a plankton collecting cod end 6 which are connected together. An annular groove is arranged on the outlet end of the plankton suction axial-flow pump, and a circle of radial elastic buckles 7 are arranged behind the annular groove. Gripping the elastic buckles 7 can slightly reduce the diameter of the annular groove on the outlet end of the axial-flow pump to conveniently sheathe the rigid ring mouth of the collecting cod end 6 in the annular groove or take the rigid ring mouth of the collecting cod end 6 out of the annular groove so as to complete connection or removal of the plankton suction axial-flow pump and the collecting cod end 6. The orientation of the plankton suction axial-flow pump varies with the water flow, and the tapered inlet end is kept to always face the direction of the natural water flow. The joint action of the balance weight 10 and the floating ball support system 4 ensures that the center of gravity of the device is located on the lower part of the whole device to keep the whole device floating on the water surface in a vertical state. The height of the solar photovoltaic cell above the water surface is more than 1.2 times the maximum wave height. The whole device is tied to the mooring anchor on the bottom of the water body by an anchor chain, which can resist impact of unprecedented stormy waves. A flow rate sensor 11 is installed in the plankton suction axial-flow pump which is driven by a variable frequency motor with adjustable power. The mesh aperture of the plankton collecting cod end 6 is less than 0.8 time the average body length of plankton to be collected.

The present invention is not intended to be limited by the schematic diagrams and the description, and can be changed without departing from the technical principle and purpose of the present invention. After the average body length and the escape speed of the target plankton to be collected are known, the collecting cod end with the mesh aperture less than 0.8 time the average body length of the target plankton can be selected, and the power of the suction axial-flow pump is adjusted to make the suction water flow rate more than 1.2 times the escape speed of the target plankton. The device of the present invention can be used for collection and utilization of the target plankton after being installed in a suitable water area. The present invention can be used for collection and utilization of plankton as well as environment governance and remediation of eutrophic water, and also can be used for eliminating or preventing breaking out of harmful algal blooms. The embodiments are as follows.

Embodiment 1: The Device of the Present Invention is Used for Collecting and Utilizing Rotifers Rotifers are common and important bait organisms in aquaculture and fishery industries, often in short supply, and difficult to cultivate and collect. However, rotifer populations with high density can be naturally flourished in large natural water areas under the proper condition. The rotifers are assumed to have an average body length of a μm and a maximum average movement speed of b cm/sec. The rotifer collecting cod end is made of bolting silk with the mesh aperture less than 0.8a μm and installed on the device of the present invention. The power of the suction axial-flow pump is adjusted to make the suction water flow rate more than 1.2b cm/sec. The above-mentioned adjusted rotifer collecting devices are arranged in an array in ponds or other water areas where rotifers are flourished. To maintain the vitality and freshness of rotifers, the rotifer collecting cod end is replaced every three hours. The replaced collecting cod end with rotifers is turned over and cleaned in aquaculture or fishery production water, such as fry rearing ponds or culture ponds, and the collected rotifers can be released to the target water to be used as fresh bait. If the number of collected rotifers is too large and exceeds the demand for fresh bait supply, the rotifer collecting cod end can be turned over, and the collected rotifers are put together, frozen or refrigerated, and then unfrozen as bait when required. When the collected rotifers are abundant, the collecting cod end with rotifers can be rinsed out with fresh water, desalted and then turned over, and the collected rotifers are put together and dried to form dried rotifer products which can be used as feed additive, attractant or protein source.

Embodiment 2: The Design of the Present Invention is Used for Prevention and Treatment of Harmful Algal Blooms or Red Tides in Water The fulminant species of the common harmful algal blooms or red tides in a certain eutrophic water area is assumed to be a certain kind of microalgae which has an average size of c μm and a maximum average movement speed of d cm/sec. The microalgae collecting cod end is made of bolting silk with the mesh aperture less than 0.8c μm and installed on the device of the present invention. The power of the suction axial-flow pump is adjusted to make the suction water flow rate more than 1.2 d cm/sec. The above-mentioned adjusted microalgae collecting devices are arranged in an array in the eutrophic water area. If the fulminant microalgae have no value in use: according to the alarm reminder of the flow rate sensor in the axial-flow pump, when the collecting cod end collects enough microalgae and the suction flow rate drops below d cm/sec, the flow rate sensor gives an alarm reminder, and the microalgae collecting cod end can be replaced in time; and the replaced microalgae collecting cod end is turned over, and the collected microalgae are put together to be subjected to harmless treatment or to be used as fertilizer. If the fulminant microalgae have a certain value in use: the microalgae collecting cod end is replaced regularly and fresh microalgae are collected, desalted and dehydrated, or frozen or refrigerated, or dried for deep processing and utilization according to the purpose of and the demand for the microalgae. As long as the devices of the present invention for collecting microalgae are arranged and used in time and the number of arrays is sufficient, harmful algal blooms or red tides can be well suppressed, and the nutritive salt in eutrophic water can be gradually removed by collection and treatment of microalgae so as to achieve the goal of environment governance and remediation of eutrophic water areas.

The invention claimed is:

1. A new energy-driven in-situ plankton collecting device, comprising a solar photovoltaic cell and wind power generation system, a buoyancy support system, a power supply and control system, a plankton suction and collection system, and an anchoring system, wherein the solar photovoltaic cell and wind power generation system is arranged above the buoyancy support system and provides power supply for the battery of the power supply and control system by using solar energy and wind power; the buoyancy support system is composed of floating balls and connecting pieces and provides buoyancy support for the whole device, and the buoyancy support system is connected with the anchoring system to keep the device vertically floating in the designated area of the water body with the center of gravity below the water surface and to ensure that the height of the solar photovoltaic cell and wind power generation system above the water surface is more than 1.2 times the maximum wave height of the water area; and the power supply and control system is connected with the plankton suction and collection system, and the plankton suction and collection system is fixed on the buoyancy support system, arranged below the water surface and above the anchoring system and composed of a plankton suction axial-flow pump and a collecting cod end which are connected by elastic buckles;

the plankton suction axial-flow pump is driven by a variable frequency motor and is provided with steady power supply by the battery; and caliber of inlet end of the plankton suction axial-flow pump gradually becomes smaller along the water flow suction direction and the inlet end always faces the direction of the natural water flow; the collecting cod end has a bag shape with a small mouth and a large belly, the mouth is a rigid ring that cannot be deformed, and the structures of both sides of the collecting cod end are the same for double-sided use; an annular groove is arranged on the periphery of the outlet end of the plankton suction axial-flow pump, radial elastic buckles with outward elasticity direction are uniformly arranged on the outer side of the groove, and gripping or loosening the circle of elastic buckles can reduce or restore the diameter of the annular groove on the outlet end of the axial-flow pump for installing or removing the collecting cod end; the annular groove on the outlet end of the axial-flow pump can be closely sheathed and connected with the rigid ring mouth of the collecting cod end;

a flow rate sensor and an alarm device are arranged in the plankton suction axial-flow pump; the initial suction water flow rate of the axial-flow pump is set to be more than 1.2 times the maximum average escape movement speed of plankton to be collected; and when the suction water flow rate of the axial-flow pump drops below the maximum average escape movement speed of plankton to be collected, the alarm device gives an alarm reminder to replace the collecting cod end.

2. The new energy-driven in-situ plankton collecting device according to claim 1, wherein the mesh size of the collecting cod end is less than 0.8 time the average size of the target plankton to be collected.

3. The new energy-driven in-situ plankton collecting device according to claim 1, wherein the anchoring system comprises a balance weight, an anchor chain and a bottom anchor, and the balance weight is tied to the bottom anchor by the anchor chain.

* * * * *